United States Patent
Cyrus

(10) Patent No.: US 11,308,313 B2
(45) Date of Patent: *Apr. 19, 2022

(54) HYBRID DEEP LEARNING METHOD FOR RECOGNIZING FACIAL EXPRESSIONS

(71) Applicant: Shutterfly, LLC, Redwood City, CA (US)

(72) Inventor: Leo Cyrus, Eden Prairie, MN (US)

(73) Assignee: Shutterfly, LLC, Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/890,309

(22) Filed: Jun. 2, 2020

(65) Prior Publication Data
US 2020/0293755 A1    Sep. 17, 2020

Related U.S. Application Data

(63) Continuation-in-part of application No. 16/012,989, filed on Jun. 20, 2018, now Pat. No. 10,679,041.

(60) Provisional application No. 62/662,663, filed on Apr. 25, 2018.

(51) Int. Cl.
| | |
|---|---|
| *G06K 9/00* | (2006.01) |
| *G06K 9/62* | (2006.01) |
| *G06N 3/08* | (2006.01) |

(52) U.S. Cl.
CPC ..... *G06K 9/00281* (2013.01); *G06K 9/00248* (2013.01); *G06K 9/6234* (2013.01); *G06N 3/084* (2013.01)

(58) Field of Classification Search
CPC .......... G06K 9/00308; G06K 9/00228; G06K 9/00281; G06K 9/6232; G06N 3/08
See application file for complete search history.

(56) References Cited

U.S. PATENT DOCUMENTS

| | | |
|---|---|---|
| 9,798,959 B2 | 10/2017 | Tang |
| 10,679,041 B2 * | 6/2020 | Cyrus ................ G06K 9/00281 |
| 2016/0140383 A1 | 5/2016 | Kim |
| 2017/0004387 A1 | 1/2017 | Fang |
| 2018/0307936 A1 | 10/2018 | Kolouri |

OTHER PUBLICATIONS

Dae Ha Kim et al, "Multi-modal Emotion Recognition using Semi-supervised Learning and Multiple Neural Networks in the Wild", 2017, ICMI '17, pp. 529-535 (Year: 2017).*

ICMI' 17, Nov. 13-17, 2017, Glasgow, UK, K Dae Ha et al., p. 529.

* cited by examiner

*Primary Examiner* — David F Dunphy
(74) *Attorney, Agent, or Firm* — Merchant & Gould P.C.

(57) ABSTRACT

A computer implemented method for recognizing facial expressions by applying feature learning and feature engineering to face images. The method includes conducting feature learning on a face image comprising feeding the face image into a first convolution neural network to obtain a first decision, conducting feature engineering on a face image, comprising the steps of automatically detecting facial landmarks in the face image, transforming the facial features into a two-dimensional matrix, and feeding the two-dimensional matrix into a second convolution neural network to obtain a second decision, computing a hybrid decision based on the first decision and the second decision, and recognizing a facial expression in the face image in accordance to the hybrid decision.

13 Claims, 4 Drawing Sheets

HYBRID DEEP LEARNING METHOD FOR RECOGNIZING FACIAL EXPRESSIONS

CROSS-REFERENCE TO RELATED APPLICATION(S)

This application is a continuation-in-part of U.S. patent application Ser. No. 16/012,989, filed Jun. 20, 2018, now U.S. Pat. No. 10,679,041, which claims the benefit of Provisional Application No. 62/662,663, filed Apr. 25, 2018, the disclosures of which are hereby incorporated by reference in their entireties. To the extent appropriate, a claim of priority is made to each of the above disclosed applications.

TECHNICAL FIELD

This application relates to digital imaging technologies, and more specifically, to recognition of facial expressions in photos.

BACKGROUND OF THE INVENTION

Digital images can be stored in user's computers and viewed on electronic display devices. The proliferation of mobile devices has enabled users to take pictures, share photos, and post photos online. Digital images can be uploaded to and stored at a central network location. Users can store, organize, edit, enhance, and share digital images using web browsers or mobile applications. Users can also design and personalize image products such as image prints, photo books, photo calendars, photo greeting cards, holiday cards, photo stationeries, photo mugs, and photo T-shirts, which incorporate users' digital images.

Handling a large number of digital images has become a challenge and an obstacle to the utilizations of images. As mobile phones and digital cameras have made photo taking very convenient, people often snap many pictures of the same scene at each moment especially if it is a special occasion. These pictures tend to be similar to each other, comprising people having similar facial expressions. The current image software usually displays all the captured images on devices, which can be overwhelming for viewing, editing, and using in product design or electronic sharing. Users have to carefully compare these similar photos, remove most of them, and keep one or a few for display for each set of people at each scene. Picking photos with the best facial expressions may require examining the photos at higher image magnifications. As a result, selecting photos is often the most time-consuming task for creating personalized image products.

Furthermore, in professional photo shooting at schools, sports events, churches, or studios etc., a photographer often takes a series of photos of one or more persons, and then manually picks the photo having the best facial expression(s) (e.g. smiles) for printing. In case a satisfactory photo is not found, the photographer may need to retake the photos or even reschedule the photo-shooting event.

There is therefore a need for an automated method to accurately recognize facial expressions in digital images. There is also a need to help photographers and others to determine quickly if a group of recently taken photos includes at least one photo that meets pre-defined quality criteria. In addition to image selection and photo-product designs, facial expression recognition also has applications in photo posting and sharing, medicine, entertainment, law, and marketing.

SUMMARY OF THE INVENTION

The present application discloses a method that can significantly enhance users' experiences associated with viewing photos and designing personalized photo products. The disclosed method can automatically recognize facial expression at higher accuracy than conventional techniques. The disclosed method can enable automated selection and recommendation of the most suitable photos for posting, sharing, and being incorporated into photo product designs. The disclosed method can help to simplify and de-clutter presentations of photos on user devices, and decrease the time and effort that users spend in managing, organizing, and utilizing their digital images, which makes the processes of photo viewing, photo sharing, and photo design creation more enjoyable.

The disclosed method can also automatically pick one or more photos having the best facial expressions in a group of recently taken photos, which enables photographers to determine quickly if at least one of the photos is good enough for printing. The disclosed photo can thus save photographers time in visual evaluations and rework. Moreover, the disclosed method is also applicable to gauging the photos against pre-determined quality standards to provide photographer performance evaluation and training.

In a general aspect, the present invention relates to a computer-implemented method for recognizing facial expressions by applying a hybrid of feature learning and feature engineering to face images. The computer-implemented method includes conducting feature learning on a face image by one or more computer processors, comprising: feeding the face image into a first convolution neural network to obtain a first decision; conducting feature engineering on a face image by the one or more computer processors, comprising: automatically detecting facial landmarks in the face image; describing each of the facial landmarks by a set of facial features; transforming the facial features into a two-dimensional matrix; and feeding the two-dimensional matrix into a second convolution neural network to obtain a second decision; computing a hybrid decision based on the first decision and the second decision; and recognizing a facial expression in the face image in accordance to the hybrid decision.

Implementations of the system may include one or more of the following. The computer-implemented method can further include multiplying the first decision by a first weight to produce a first weighted decision; and multiplying the second decision by a second weight to produce a second weighted decision, wherein the hybrid decision can be computed based on the first weighted decision and the second weighted decision. The hybrid decision can be an average, a sum, or a root-mean square function of the first weighted decision and the second weighted decision. The computer-implemented method can further include updating the first weight and the second weight in the hybrid decision by backpropagation. The computer-implemented method can further include automatically detecting a face in a digital image by the one or more computer processors; extracting a face portion surrounding the face from the digital image by the one or more computer processors; and normalizing the face portion to obtain the face image. The facial landmarks features can respectively describe at least a portion of an eye, an eyebrow, a mouth, a chin, an edge of a face, or a nose in the face image. The facial landmarks features can include a plurality of groups each of which describes at least a portion of a facial feature. Each of the facial features can be described by a pair of coordinates. The step of transforming the facial features into a two-dimensional matrix can include expressing each of the facial features by a pair of coordinates; and forming a first matrix using the facial features and their respective coordinates. The computer-implemented method can further include concatenating copied of the first matrix one or more times to produce the two-dimensional matrix. The two-dimensional matrix can be a square matrix.

These and other aspects, their implementations and other features are described in detail in the drawings, the description and the claims.

DETAILED DESCRIPTION OF THE INVENTION

There are two main approaches for facial expression recognition: methods based on feature engineering and methods based on feature learning. In the feature engineering approach, an expert designs methods to extract facial features. The facial features are identified in images and are used for image classification. In the feature learning methods, the abstracts and representations of features are automatically extracted from the images by machine learning, which is then used to perform classification.

Figure 1:
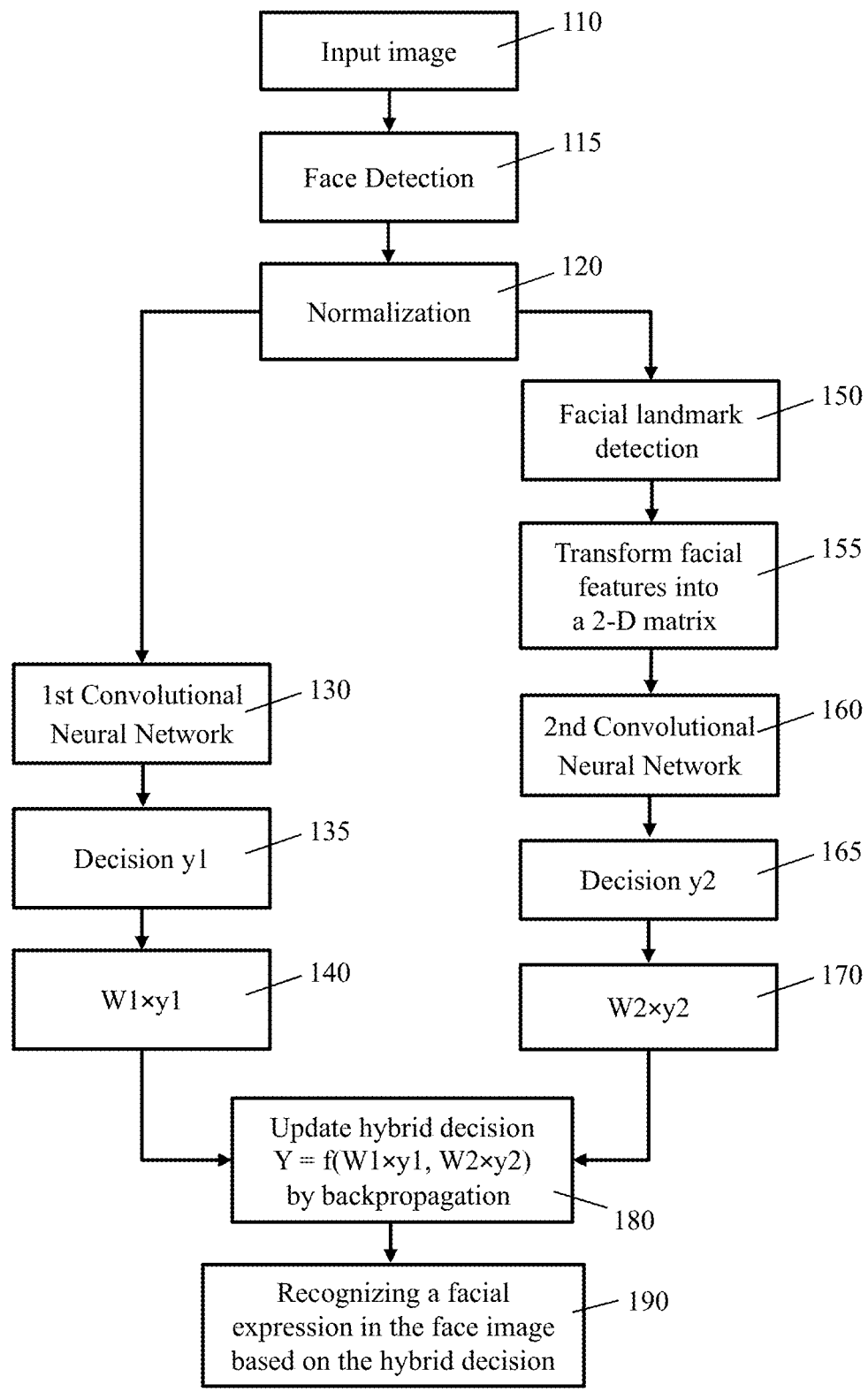
FIG. 1 is a flowchart for a hybrid deep-learning method for recognizing facial expressions in accordance with the present invention.

In some embodiments, FIG. 1 shows an improved method of facial expression recognition. The disclosed method involves applying deep learning to both the face image itself as well as facial features automatically detected in the face image. The hybrid approach of applying deep learning and intelligence about facial features can achieve higher recognition accuracies than conventional techniques.

It should be noted that the steps illustrated in FIG. 1 can be automatically conducted by a computer processor on a mobile device, a stand-alone computer, or a networked computer and a cloud computing system.

An input image is received in step 110. Face detection is performed on the image in step 115. The face portion is recognized by a bounding box and cropped to produce an input face image, and is normalized (step 120).

The disclosed hybrid deep learning method includes two branches. In the first branch, the input face image is fed into a first convolutional neural network (CNN) for training (step 130). The output decision is saved as "y1" (step 135). The decision y1 is multiplied by a weighting factor W1 (step 140) to produce a first weighted decision.

Figure 3:
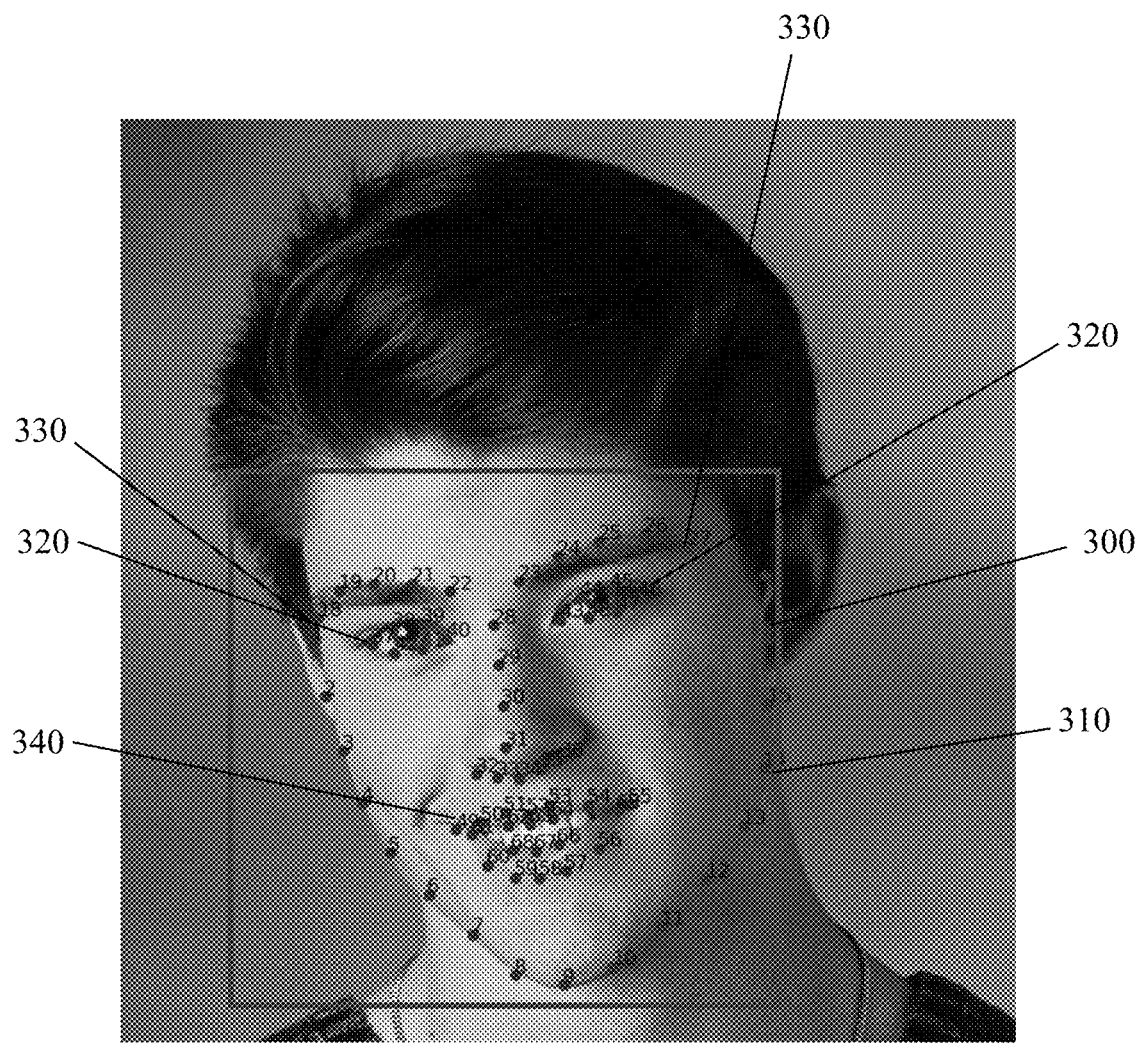
FIG. 3 illustrates exemplified facial landmarks and associated facial features in a face image.

In the second branch, facial landmark detection is automatically performed on the input face image (step 150) to extract facial landmarks such as eyes, eyebrows, the mouth, the chin, an edge of a face, or the nose in the face image. As part of human knowledge, these facial landmarks are very relevant to the identification of facial expressions. Each of the facial landmarks can include a group of facial features. Each facial feature can be expressed by at least one pair of (x, y) coordinates. In one example, referring to FIG. 3, 68 facial features are automatically detected and extracted from several facial landmarks in a face 300. The facial landmarks can include an edge 310 of the chin, outside edges 320 of the eyes, upper edges 330 of the eyebrows, and outlines 340 of the mouth, etc. Each facial feature is described by a plurality of points, that is, facial features. For example, the facial landmark "the edge 310 of the chin" can include 16 points (i.e. facial features) each being described by a pair of (x, y) coordinates.

The facial features extracted one face image together can be considered as components of a feature vector. The components of this feature vector are transformed into a 2-D matrix (step 155). For example, 68 face features are extracted from the face 300 in FIG. 2, which produces 68 pairs of coordinates in the face image. The set of coordinates for all the face features in the face 300 can be considered a feature vector for the face 300.

Figure 4:
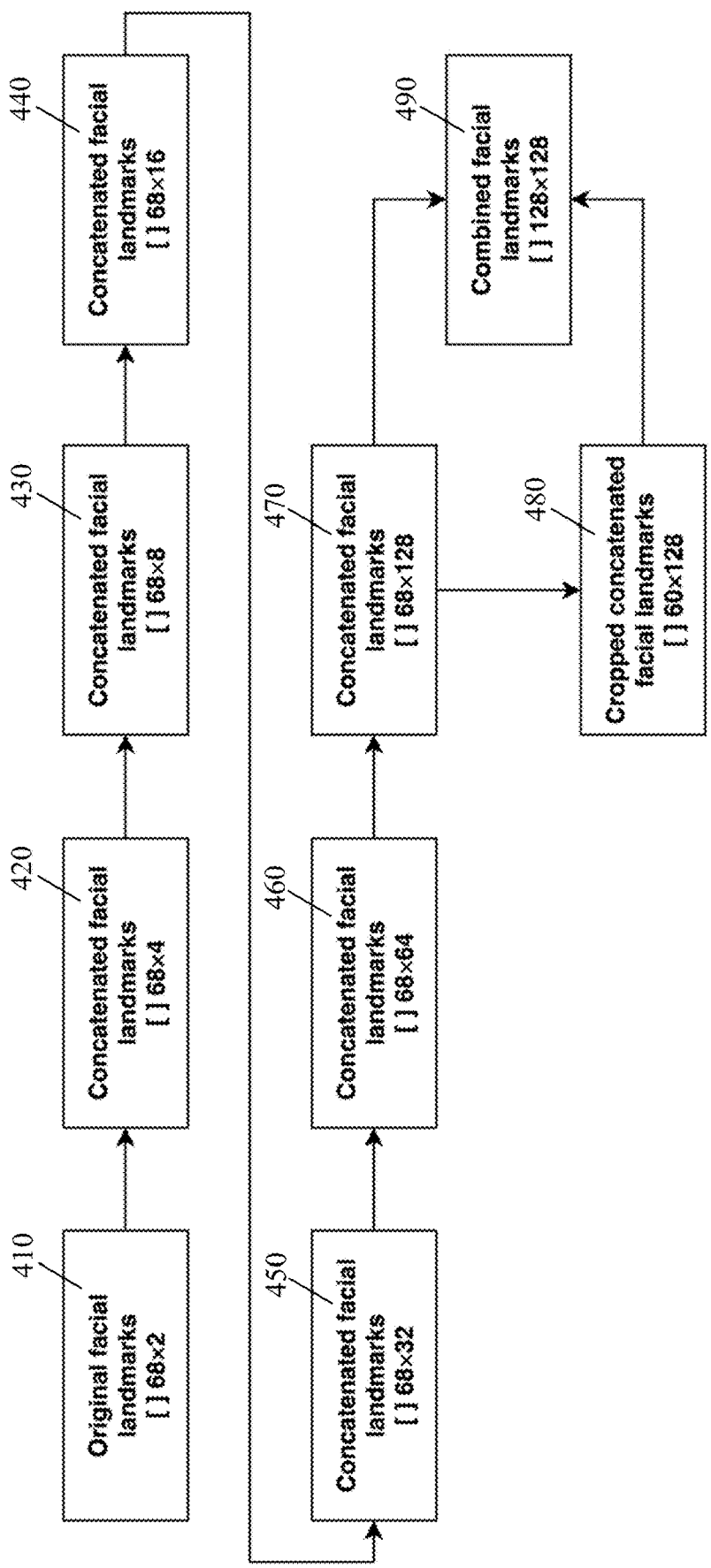
FIG. 4 is an exemplified flowchart for transforming the facial features into a 2-D matrix suitable as input to CNN.

An example of transforming such a feature vector to a 2D matrix is shown in FIG. 4. An original facial features matrix is formed by the 68 pairs of coordinates and thus has dimensions of 68×2. Two copied of the original facial features matrix of 68×2 (410) is concatenated vertically with itself to produce a 68×4 matrix (420). Then the same process is applied to the resulting 68×4 matrix to produce a 68×8 matrix (430). This process is repeated four more times (440-470) to eventually produce a 68×128 matrix (470). Then the first 60 columns (i.e. a cropped portion) of this 68×128 matrix is copied and combined with this matrix to finally produce a 2D 128×128 matrix (490), which is then normalized and fed into the 2nd CNN (in step 160 in FIG. 2). In one implementation, the 2D matrix can be a square matrix.

After normalization, the 2D matrix is fed into a second CNN (step 160), which outputs another decision "y2". The decision y2 is given a multiplying weighting factor W2 (step 170) to produce a second weighted decision.

The two weighted decisions are used to obtain a hybrid decision Y that is a function of W1×y1 and W2×y2, that is, Y=f(W1×y1, W2×y2) (step 180). For example, Y can be the average, the sum, the root-mean square, and other functions W1$y$1 and W2$y$2. In one example, Y=(W1×y1+W2×y2)/2.

The weights W1 and W2 can be initialized randomly, and the decision weights are updated via backpropagation (step 180). A facial expression is recognized in the face image based on the hybrid decision (step 190).

During the regular backpropagation process the network's error is minimized by calculating the gradient of the error with respect to the network's weights. This helps finding the optimized network weights. In the disclosed method, decision weights (W1 and W2) are added as trainable parameters to be optimized during the backpropagation process. This helps to find the optimized decision weights for better classification accuracy.

Figure 2A:
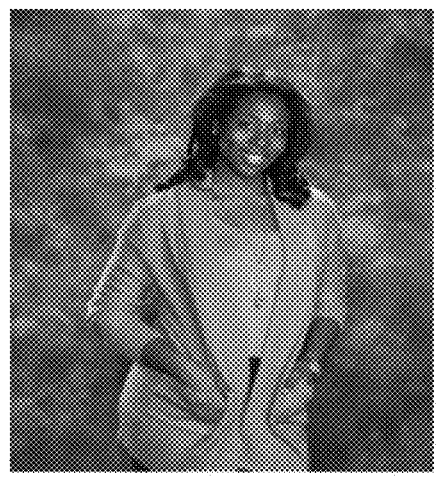
FIGS. 2A-2C show image examples of different facial expressions: full smile (FIG. 2A), game smile (FIG. 2B), and soft smile (FIG. 2C).
Figure 2B:
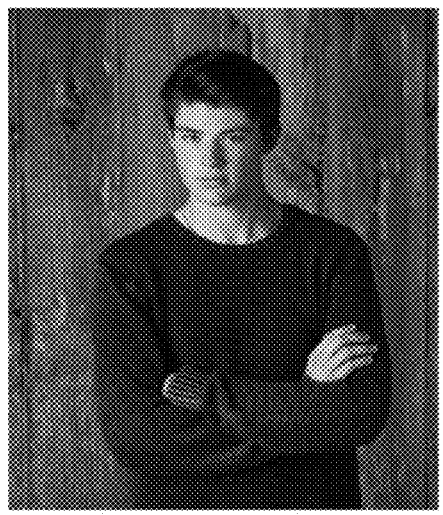
Figure 2C:
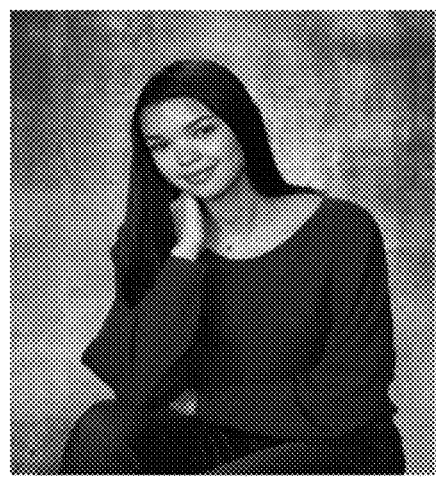

In one example, this disclosed method is implemented and evaluated for facial expression recognition to evaluate how well the photos conform to pre-defined classification standards/categories for facial expressions. As shown in FIGS. 2A-2C, these expressions are divided into three main categories: full smile, game face, and soft smile. 665, 157, and 282 images are respectively acquired for Full smile, Game face, and Soft smile. Face detection is then performed using OpenCV on those images to extract 651, 148, and 276 face images. Data augmentation is performed on individual images to produce 41 images out of each image. So, in total around 44,000 images were obtained in the dataset.

The data is divided into train set (90%) and test set (10%). Ten percent of train data is specified for validation. Then the train data is fed into a deep neural network for training. Then the trained network is tested on the test dataset and 97% classification accuracy is achieved. Furthermore, the trained network is tested on a new set of images, which contained new subjects. 129 face images are obtained from 137 images. Then the trained network is tested on the new face images and 89% accuracy is obtained.

The presently disclosed method can include one or more of the following advantages. By automatically extracting and feeding facial features into a deep neural network, the input to the CNN is endowed with human knowledge about a face and intrinsic aspects of facial expressions. Thus, the input to CNN has much higher information content and qualitative depth, which helps to achieve higher detection accuracy.

In one aspect, a hybrid weighted decision approach combines the facial features with the learned features, and weights on the probabilities are updated through backpropagation. The disclosed automated method can benefit from the optimized properties of both feature engineering and feature learning methods.

It should be understood that the presently disclosed systems and methods can be compatible with different devices and image products or applications other than the examples described above. The mobile, stand-alone, network-based, or cloud computing system, intelligent camera and photo selection systems, and photo quality control systems in photo printing labs can be implemented with different hardware or software configurations without deviating from the spirit of the present invention. User behaviors, product types, user categories, and category specifications are not limited to the described examples in order to remain compatible with the disclosed invention.

What is claimed is:

1. A computer-implemented method for recognizing facial expressions, comprising:
    feeding a face image into a first convolution neural network to obtain a first decision by one or more computer processors;
    automatically detecting facial landmarks in the face image;
    describing each of the facial landmarks by a set of facial features;
    transforming the facial features that describe the facial landmarks into a two-dimensional matrix comprising coordinates of the facial features by the one or more computer processors;
    feeding the two-dimensional matrix into a second convolution neural network to obtain a second decision;
    computing a hybrid decision based on the first decision and the second decision; and
    recognizing a facial expression in the face image in accordance to the hybrid decision.

2. The computer-implemented method of claim 1, further comprising: multiplying the first decision by a first weight to produce a first weighted decision; and multiplying the second decision by a second weight to produce a second weighted decision, wherein the hybrid decision is computed based on the first weighted decision and the second weighted decision.

3. The computer-implemented method of claim 2, further comprising:
    updating the first weight and the second weight in the hybrid decision by backpropagation.

4. The computer-implemented method of claim 1, wherein the hybrid decision is an average, a sum, or a root-mean square function of the first decision and the second decision.

5. The computer-implemented method of claim 1, wherein the two-dimensional matrix comprises multiple pairs of coordinates each associated with one of the facial features.

6. The computer-implemented method of claim 1, further comprising:
    automatically detecting a face in a digital image by the one or more computer processors;
    extracting a face portion surrounding the face from the digital image by the one or more computer processors; and
    normalizing the face portion to obtain the face image.

7. The computer-implemented method of claim 1, wherein the facial landmarks are respectively associated with at least a portion of an eye, an eyebrow, a mouth, a chin, an edge of a face, or a nose in the face image.

8. The computer-implemented method of claim 1, wherein the facial landmarks include a plurality of groups each of which describes at least a portion of a facial feature.

9. The computer-implemented method of claim 8, wherein the facial landmarks include an eye, an eyebrow, a mouth, a chin, an edge of a face, or a nose in the face image.

10. The computer-implemented method of claim 1, wherein each of the facial features is described by a pair of coordinates.

11. The computer-implemented method of claim 1, wherein transforming the facial features into a two-dimensional matrix comprises:
    describing each of the facial features by a pair of coordinates; and
    forming a first matrix using the facial features and their respective coordinates.

12. The computer-implemented method of claim 11, further comprising:
    concatenating copied of the first matrix one or more times to produce the two-dimensional matrix.

13. The computer-implemented method of claim 1, wherein the two-dimensional matrix is a square matrix.

* * * * *